United States Patent [19]
O'Dell

[11] 3,741,160
[45] June 26, 1973

[54] COVER FOR AN AQUARIUM
[75] Inventor: Clark L. O'Dell, Saginaw, Mich.
[73] Assignee: O'Dell Manufacturing, Inc., Saginaw, Mich.
[22] Filed: Sept. 27, 1971
[21] Appl. No.: 184,046

[52] U.S. Cl. .................................................. 119/5
[51] Int. Cl. .......................................... A01k 64/00
[58] Field of Search ........................ 119/5; 220/41; 312/138, 293, 301, 305

[56] References Cited
UNITED STATES PATENTS
3,125,065  3/1964  Willinger ............................. 119/5
2,002,380  5/1935  Wernicke et al. .................. 119/5 X
2,276,635  3/1942  Weber ................................ 220/41

FOREIGN PATENTS OR APPLICATIONS
802,398  9/1936  France ............................... 312/138

Primary Examiner—Hugh R. Chamblee
Attorney—Learman & McCulloch

[57] ABSTRACT

An open top aquarium having a pair of upper end support members with double tracks slidably receiving a pair of relatively movable cover sections, and an additional, easily cuttable cover section removably clamped to one of the relatively movable cover sections.

11 Claims, 5 Drawing Figures

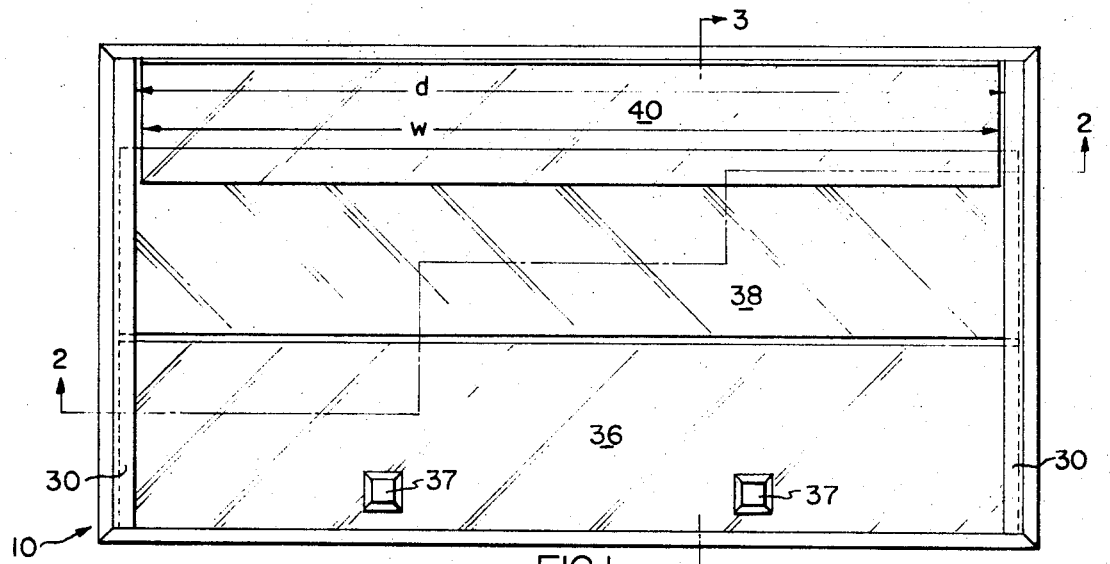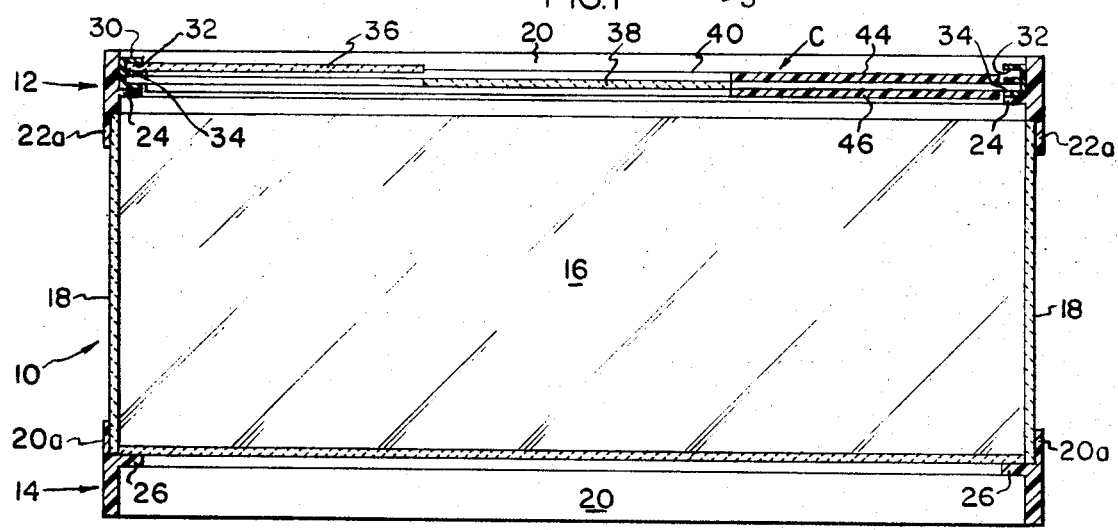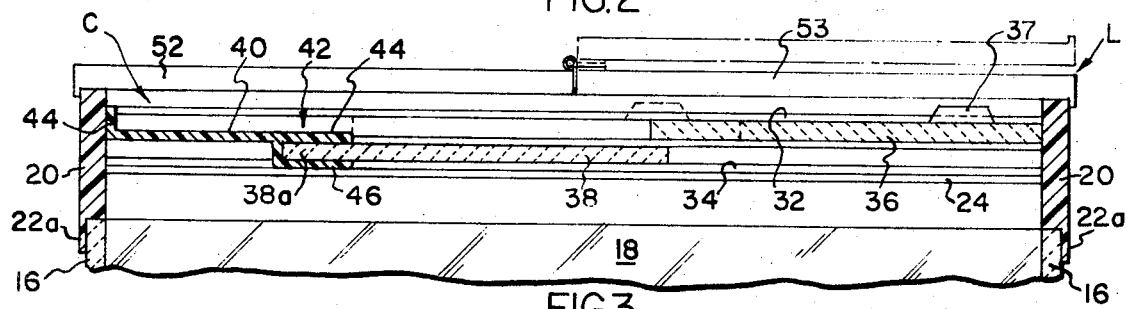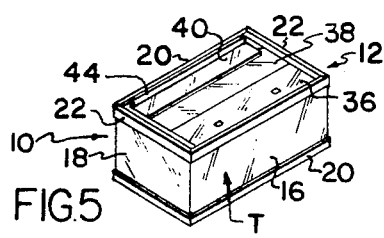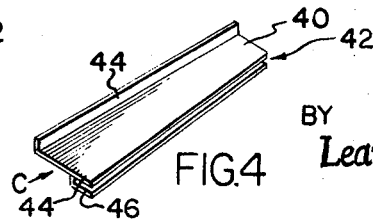

COVER FOR AN AQUARIUM

FIELD OF THE INVENTION

This invention relates to an aquarium and more particularly to a cover for an open top aquarium comprising a plurality of transparent cover sections which are relatively movable in such a manner as to enhance accessability to the inside of the aquarium, and which facilitate the mounting of accessory equipment on the aquarium.

BACKGROUND OF THE INVENTION

Aquariums are frequently provided with covers for their open tops to minimize the evaporation of the water therein, to protect the contents thereof, to prevent fish from jumping out of the aquarium, and to prevent foreign objects from being inadvertently introduced into the aquarium. It has been customary in the past to swingably mount a cover on an aquarium with hinge members so as to permit the cover to move between a swung up open position and a closed position covering the open top of the aquarium.

When certain types of fish are housed in the aquarium, it is necessary to completely cover the top of the tank with lighting fixtures. It is customary to support such fixtures above the swingable cover. To feed fish housed in an aquarium having such a cover, it is firstly necessary to remove the light fixtures, prior to swinging the cover to its open position. This, of course, is time consuming and the repeated handling of the light fixtures results in damaged equipment.

Accordingly, it is an object of the present invention to provide an aquarium cover which is not swingably mounted on the aquarium.

It is another object of the present invention to provide an aquarium cover which is movable between closed and open positions to selectively permit access to the aquarium without the necessity of completely removing light fixtures which may be supported thereon.

It is also customary to mount liquid pumps, aerators, and the like on the aquarium. Hoses and tubes connected with this equipment normally extend through a portion of the cover into the water inside the aquarium. Although it is possible to pre-cut a number of standardly located holes in a portion of a cover, during its manufacture, to facilitate the passage of such tubes, generally each aquarium owner prefers to have a customized cover which is particularly adapted to his particular equipment. Accordingly, it is a further object of the present invention to provide an aquarium cover with a separable portion which can be removed from the remainder of the cover and moved to a remote location to cut apertures that receive various parts of equipment necessary to operate the aquarium.

It is still another object of the present invention to provide an aquarium cover which is separably supported on inwardly directed flanges provided on the top of the aquarium.

Other objects and advantages of the present invention will become apparent as the description thereof proceeds.

SUMMARY OF THE INVENTION

Apparatus for covering an open top aquarium, comprising a pair of longitudinally spaced end support members adapted to be supported by the aquarium, and a plurality of longitudinal cover sections supported by the end members for relative lateral movement between positions covering the top and positions in which a portion of the top is uncovered.

The present invention may be readily described by reference to the accompanying drawings in which:

FIG. 1 is a top plan view of an open top aquarium having a cover, constructed according to the present invention, mounted thereon;

FIG. 2 is a sectional side elevational view, taken along the line 2—2 of FIG. 1;

FIG. 3 is a sectional end elevational view taken along the line 3—3 of FIG. 1;

FIG. 4 is a greatly reduced, perspective view illustrating the separable cover section of the cover; and FIG. 5 is a greatly reduced, perspective view of an aquarium having a cover constructed according to the present invention mounted thereon and disposed in closed position.

DESCRIPTION OF THE PREFERRED EMBODIMENT

Apparatus constructed according to the present invention is particularly adapted for use with an aquarium, generally designated 10, which includes upper and lower rectangular frame members, generally designated 12 and 14 respectively, spanned by side walls 16 and end walls 18 which are transparent, glass, plates or inserts. The upper and lower frame members 12 and 14 are generally identical and each includes extruded plastic side frame sections 20 and end frame sections 22 having inwardly disposed support flanges 24 and 26, respectively. The side and end frame sections 20 and 22 also include integral vertical flanges 20a and 22a to prevent outward lateral displacement of the transparent side and end walls 18 and 16 respectively. The support flange 26 on the lower frame members 20 and 22 support a glass bottom wall member 28.

The junctures of the end walls 18, the side walls 16, and the bottom wall 28 are sealed with a suitable sealant to provide a water tight enclosure defining a tank T in which water and sea life are disposed. The inwardly directed end, support flanges 24 on the upper frame member 14 support the cover, generally designated C, which is constructed according to the present invention.

A cover C constructed according to the present invention may be supplied in kit form and includes a pair of identical, longitudinally spaced apart track forming end members 30 removably supported on the longitudinally spaced end flanges 24 of the upper frame member 12. The end members 30 each provide a pair of upper and lower tracks 32 and 34 respectively. Spanning the side frame members 30 and received in the upper track 32 is a transparent, glass cover section 36 having handle members 37 thereon which are manually grasped to move the cover section 36 in the track 32. Spanning the upper frame end members 30 and received in the lower tracks 34 is a second longitudinal, transparent, glass cover section 38 movable between the position shown in FIG. 3 and a position underlying the cover section 36.

Removably clamped on the rear portion 38a of the midsection 38 is a cover section 40 having a bifurcated clamping portion, generally designated 42, comprising upper and lower spreadable lips or jaw members 44 and 46 which grip the rear portion 38a of the mid-section 38. The separable cover section 40 includes a marginal longitudinal vertical flange 44 to facilitate manual grasping thereof to move it, and the clamped cover section 38, toward the other cover section 36. The separable cover section 40 is formed of an easily cuttable transparent plastic sheet material which can be easily cut to provide apertures for receiving the hoses, tubes, and the like, of an aerator, pump or other piece of similar aquarium equipment (now shown).

When certain fish, such as salt water fish, are housed in the aquarium, lighting apparatus, generally designated L, is mounted on the upper frame member 12 and includes realtively foldable sections 50 and 52 which are movable between the operative solid line positions, shown in FIG. 3, and the chain line position, shown in FIG. 3, to uncover the rear cover section 40. The cover sections 40 and 38 can then be simultaneously moved toward the section 36 to superpose the cover sections 38 and 36 so that access may be had to the aquarium interior through the space just vacated by the cover section 40. If the cover C were hinged on the frame 20 and 22 such that it had to be swung upwardly, the light fixtures L would, of course, have to be removed prior to insertion of material through the space vacated by the cover section 40. As illustrated in FIG. 1, the length w of the rear section 40 is less than the distance d between the end members 30 so that the cover section 40 can, when removed from the mid-section 38, pass vertically upwardly between the end members 30. When the cover section 40 is thus removed, it can be moved to a remote location, such as a workbench, where holes can be conveniently cut or drilled to receive the communicating tubes of the aquarium accessory equipment (now shown).

The entire cover C may, of course, be removed from the support flange 24 by merely lifting the end members 30 upwardly after the lighting fixtures L have been removed. The cover C can then be quickly disassembled by merely sliding the end members 30 endwisely away from the cover sections 36, 38 and 40.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for a covering and uncovering selected portions of an open top aquarium, or the like, comprising:
   a pair of longitudinally spaced, end support members, adapted to be supported by said aquarium, including confronting upper and lower sets of tracks;
   a first cover section, spanning said end support members, slidably received in one of said sets of tracks for lateral movement therein;
   a second cover section, spanning said end support members, slidably received in the other of said sets of tracks for lateral movement between a position juxtaposed with said first section and a laterally offset position; and
   a third cover section separably clamped to said second slidable cover section for movement therewith and being of a length less than the distance between said end support members to permit relative vertical movement of said third cover section when it is separated from said second cover section.

2. The apparatus set forth in claim 1 wherein said second cover section consists of a flat, transparent plate, said third cover section includes a bifurcated plate gripping member including spreadable lips, at one lateral side, movable to spread positions and received on vertically opposite sides of said plate, to separably hold said third cover section on said second cover section.

3. The apparatus set forth in claim 2 wherein said third cover section, at the laterally opposite side, includes upstanding flange means.

4. The apparatus set forth in claim 1 wherein said third cover section includes means clamping said third section to said second section in such a manner that said third cover section is separable by relative lateral movement only of said second and third sections away from each other.

5. The apparatus of claim 1 wherein said end track members are bodily movable independently of each other to permit disassembly of the covering apparatus.

6. In combination with an aquarium defining a liquid containing tank having an upwardly opening mouth, said aquarium having inwardly directed cover support flange means, cover means for covering and uncovering selected portions of the top comprising:
   a pair of longitudinally spaced, end support members removably supported by said cover support flange means, including confronting sets of upper and lower tracks;
   a first cover section, spanning said support members, slidably received in one of said sets of tracks;
   a second cover section, spanning said support members, slidably received in the other of said sets of tracks for lateral movement between a position juxtaposed with said first section and a laterally offset position;
   a third cover section separably clamped to said second slidable cover section for movement therewith and being of a length less than the distance between said end track members to permit relative vertical movement of said third cover section when it is separated from said second cover section.

7. The combination set forth in claim 6 wherein said end track members are movable independently of each other on said cover support flange means.

8. The combination set forth in claim 6 wherein said third cover section includes means clamping said third section to said second section in such a manner that said third cover section is separable by relative lateral movement only of said second and third sections away from each other.

9. The combination of claim 8 wherein said second cover section consists of a flat, transparent plate, said third cover section including a bifurcated, plate gripping member including, at one lateral side, laterally extending, opposed, spreadable lips, moved to spread positions and received on vertically opposite sides of said plate to separably hold said third cover section on said second cover section.

10. The combination set forth in claim 9 wherein said third cover section includes upstanding flange means on the laterally opposite side thereof.

11. The combination of claim 6 wherein said inwardly directed flange means is disposed below the top of said aquarium a sufficient distance such that said cover is below the top of the squarium when it is supported by said means.

* * * * *